(12) United States Patent
Kato et al.

(10) Patent No.: US 6,648,294 B2
(45) Date of Patent: Nov. 18, 2003

(54) MIRROR DEVICE FOR A VEHICLE

(75) Inventors: Hitoshi Kato, Niwa-gun (JP); Fuminori Teraoka, Niwa-gun (JP); Hiroki Iwasa, Niwa-gun (JP); Shigeki Yoshida, Niwa-gun (JP); Masakazu Aoki, Niwa-gun (JP); Toshinobu Mizutani, Niwa-gun (JP)

(73) Assignee: Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/881,056

(22) Filed: Jun. 15, 2001

(65) Prior Publication Data

US 2002/0006003 A1 Jan. 17, 2002

(30) Foreign Application Priority Data

Jun. 22, 2000 (JP) ........................................ 2000-187824

(51) Int. Cl.[7] ................................................ A47G 1/24
(52) U.S. Cl. ...................................... 248/479; 248/476
(58) Field of Search .............................. 248/466, 475.1, 248/476, 479, 481, 482; 359/872, 841, 876

(56) References Cited

U.S. PATENT DOCUMENTS

| | | | | |
|---|---|---|---|---|
| 4,701,037 A | * | 10/1987 | Bramer | 350/634 |
| 5,227,924 A | * | 7/1993 | Kerper | 359/875 |
| 5,268,795 A | * | 12/1993 | Usami | 359/841 |
| 6,109,586 A | * | 8/2000 | Hoek | 248/476 |
| 6,116,743 A | * | 9/2000 | Hoek | 359/871 |
| 6,276,808 B1 | * | 8/2001 | Foote et al. | 359/877 |
| 6,310,738 B1 | * | 10/2001 | Chu | 359/883 |

FOREIGN PATENT DOCUMENTS

JP 62-125635 8/1987

* cited by examiner

Primary Examiner—Leslie A. Braun
Assistant Examiner—Kofi Schulterbrandt
(74) Attorney, Agent, or Firm—Nixon Peabody, LLP

(57) ABSTRACT

In a door mirror device for a vehicle, an retracting device supports a mirror by coupling a mirror angle adjusting device for holding the mirror with a holding portion of a frame and coupling the retracting device fixed to a vehicle body with a supporting portion of the frame. The frame is provided with the holding portion and the supporting portion formed by drawing a frame-forming metal plate which has been formed by pressing, and a portion connecting the holding portion and the supporting portion is provided with a difference in level. Thus, the frame can have sufficient rigidity.

22 Claims, 4 Drawing Sheets

MIRROR DEVICE FOR A VEHICLE

BACKGROUND OF THE INVENTION

1. Field of the Invention

The present invention relates to a mirror device for a vehicle provided to a vehicle exterior.

2. Description of the Related Art

A conventional door mirror device for a vehicle is provided with, for example, a substantially plate-like frame. The frame is provided with a holding portion at a vehicle outer rear side thereof, and a mirror angle adjusting device, which rockably holds a rear-view mirror, is coupled to the holding portion. The mirror angle adjusting device rocks the mirror to adjust a surface angle of the mirror.

The door mirror device for a vehicle is further provided with an retracting device, which includes a stand made of a metal and a casing member made of a resin. The stand is fixed to the vehicle body (a door mirror stay provided on a door of the vehicle) and rotatably supports the casing member. The casing member is coupled with a supporting portion formed at a vehicle inner rear side of the frame, and the retracting device thus supports the mirror via the frame and the mirror angle adjusting device. When the retracting device rotates the casing member with respect to the stand, the mirror is accommodated or caused to stand.

The frame, the mirror angle adjusting device and the retracting device are accommodated in a door mirror visor, and the door mirror visor is fixed to the frame.

However, in the above-described door mirror device for a vehicle, the weight of the door mirror visor is acting on the frame, and the weights of the mirror angle adjusting device and the mirror are acting on the holding portion of the frame. Further, the weights of the mirror angle adjusting device, the mirror and the frame itself are acting on the supporting portion of the frame. Therefore, the frame is required to be sufficiently rigid (particularly at the holding portion, the supporting portion and a portion connecting them). Sufficient rigidity of the frame is also required in order to reduce chattering of the mirror so that an image reflected in the mirror is not affected. To this end, the frame is made thick by forming the frame of a resin or by die casting or the like. However, this makes the frame expensive.

On the other hand, if the frame is produced by pressing an iron plate, a cost for producing the frame can be reduced, however, sufficient rigidity of the frame cannot be ensured.

Further, when the casing member deflects due to a vibration of the vehicle, a wind pressure, and the like, the mirror chatters via the frame and the mirror angle adjusting device, and a visibility of a rearward view reflected in the mirror is impaired (particularly, since a deflection of the casing member in a vehicle longitudinal direction changes the angle of the mirror, the visibility of the rearward view reflected in the mirror tends to be impaired).

SUMMARY OF THE INVENTION

In view of the aforementioned, an object of the present invention is to provide a mirror device for a vehicle provided with a frame which can be produced at a low cost and has sufficient rigidity, and in which a visibility of a rearward view reflected in a mirror can be improved.

A first aspect of the present invention is a mirror device for a vehicle, the mirror device comprising: (a) a frame comprising a frame-forming metal plate formed by a pressing process, the frame including a holding portion, a supporting portion, and a drawn portion, the drawn portion being disposed at a portion connecting the holding and supporting portions to one another, with the holding, supporting and drawn portions each being drawn by carrying out a drawing process on the frame-forming metal plate; (b) a holding member for holding a rear-view mirror, coupled to the holding portion; and (c) a supporting member coupled to the supporting portion, with the supporting member mountable to a vehicle.

The frame of the mirror device for a vehicle includes the holding portion and the supporting portion. The holding member for holding the mirror is coupled with the holding portion and the supporting member fixed to the vehicle body is coupled with the supporting portion. Thus, the supporting member supports the mirror via the frame and the holding member. Therefore, the holding portion, the supporting portion and a portion connecting these two portions of the frame are required to have high rigidity in order to reduce chattering of the mirror so that an image in the mirror is not affected.

Further, the holding portion of the frame may hold not only the mirror but also, for example, the holding member such as the mirror angle adjusting device for adjusting the surface angle of the mirror, and the supporting portion of the frame may hold a supporting member such as the retracting device for accommodating the mirror or for causing the mirror to stand. Therefore, in order to hold these heavy items (the mirror angle adjusting device and the retracting device) with certainty, the holding portion, the supporting portion and the portion connecting these two portions of the frame are required to have high rigidity.

Since the holding portion and the supporting portion are respectively formed by drawing the frame-forming metal plate which has been formed by pressing, the holding portion and the supporting portion respectively have sufficient rigidity. Further, since the portion connecting the holding portion and the supporting portion is provided with the drawn portion formed by drawing, the connecting portion also has sufficient rigidity provided by the drawn portion. Thus, the frame can have sufficient rigidity. Therefore, chattering of the mirror can be reduced so that an image in the mirror is not affected, and the frame can hold the heavy items (the mirror angle adjusting device and the retracting device) with certainty.

In addition, since the frame is formed from the frame-forming metal plate, the frame can be produced at a low cost.

The mirror device for a vehicle of the present invention is preferable that the supporting portion is drawn to a level of depth deeper than the holding portion.

Since the supporting portion of the frame supports an entire mirror assembly (including, for example, the mirror, the mirror angle adjusting device (the supporting device), the door mirror visor, and the like), it is required to have the highest rigidity.

The depth of drawing of the supporting portion of the frame is deeper than that of the holding portion of the frame to provide a difference in level at the portion connecting them so that the supporting portion of the frame is provided with a higher rigidity. Thus, the supporting portion of the frame can hold the entire mirror assembly with certainty.

A second aspect of the present invention is a mirror device for a vehicle comprising: (a) a frame for at least one of directly and indirectly holding a rear-view mirror; (b) a projecting portion integrally formed at the frame and projecting towards the vehicle front side or the vehicle rear side with respect to the frame when the mirror device is in use with a vehicle; and (c) a supporting member coupled with the frame and the projecting portion for supporting the mirror, and mountable to the vehicle.

In this mirror device for a vehicle, the supporting member fixed to the vehicle body supports the mirror via the frame.

The projecting portion projecting toward the vehicle front side or the vehicle rear side is integrally formed at the frame, and the supporting member is coupled with the two portions: the frame and the projecting portion. Thus, the frame and the projecting portion can prevent the supporting member from being deflected by vibration of the vehicle, wind pressure, or the like, and chatter of the mirror generated via the frame can be prevented, thereby improving the visibility of a rearward view reflected in the mirror. Particularly, deflection of the supporting member in the vehicle longitudinal direction can be prevented by the projecting portion, and therefore a change of an angle of the mirror due to the deflection can be prevented to effectively improve the visibility of a rearward view reflected in the mirror.

Furthermore, even when strength of the supporting member is low, the frame and the projecting portion can prevent a deflection of the supporting member. Therefore, it is not necessary to increase a thickness of the supporting member to increase the strength of the supporting member. Thus, the supporting member does not to be large and the supporting member (such as the retracting device) can be installed in a small size car (such as a light car).

The mirror device for a vehicle of the present invention preferably, further comprising a coupling member, wherein the projecting portion comprises a vertical wall substantially perpendicular with respect to, and integrally connected to the frame, and a parallel wall substantially parallel to the frame, and the supporting member is coupled with the frame and the projecting member by the coupling member being inserted through the frame, the supporting member, and the parallel wall, with the supporting member enclosed by the frame, and the vertical and parallel walls.

The supporting member is fixed to the frame and the parallel wall with the coupling member being inserted through the frame, the supporting member and the parallel wall in a state in which the supporting member is enclosed by the frame, the vertical wall (a side wall which is substantially vertical with respect to and integral with the frame) and the parallel wall (a side wall which is substantially parallel to the frame and integral with the vertical wall) of the projecting portion. Therefore, the supporting member can be firmly coupled with the frame and the projecting portion with certainty, thereby further improving the visibility of a rear view reflected in the mirror.

In addition, since the supporting member is fixed to the frame and the parallel wall by inserting the coupling member in one direction (a direction in which the coupling member passes through the frame, the supporting member and the parallel wall), the supporting member can be easily coupled with the frame and the projecting portion.

Another aspect of the present invention is a method of forming a mirror device for a vehicle comprising the steps of: (a) pressing a metal into a plate for use as a frame; (b) drawing the plate to form a holding portion, a supporting portion, and a drawn portion between the holding and supporting portions; (c) coupling to the holding portion a holding member for holding a mirror; and (d) coupling to the supporting portion a supporting member mountable to a vehicle.

DESCRIPTION OF THE PREFERRED EMBODIMENTS

The present invention has first and second embodiments. The first embodiment is described first, and the second embodiment is described later.

First Embodiment

Figure 1:
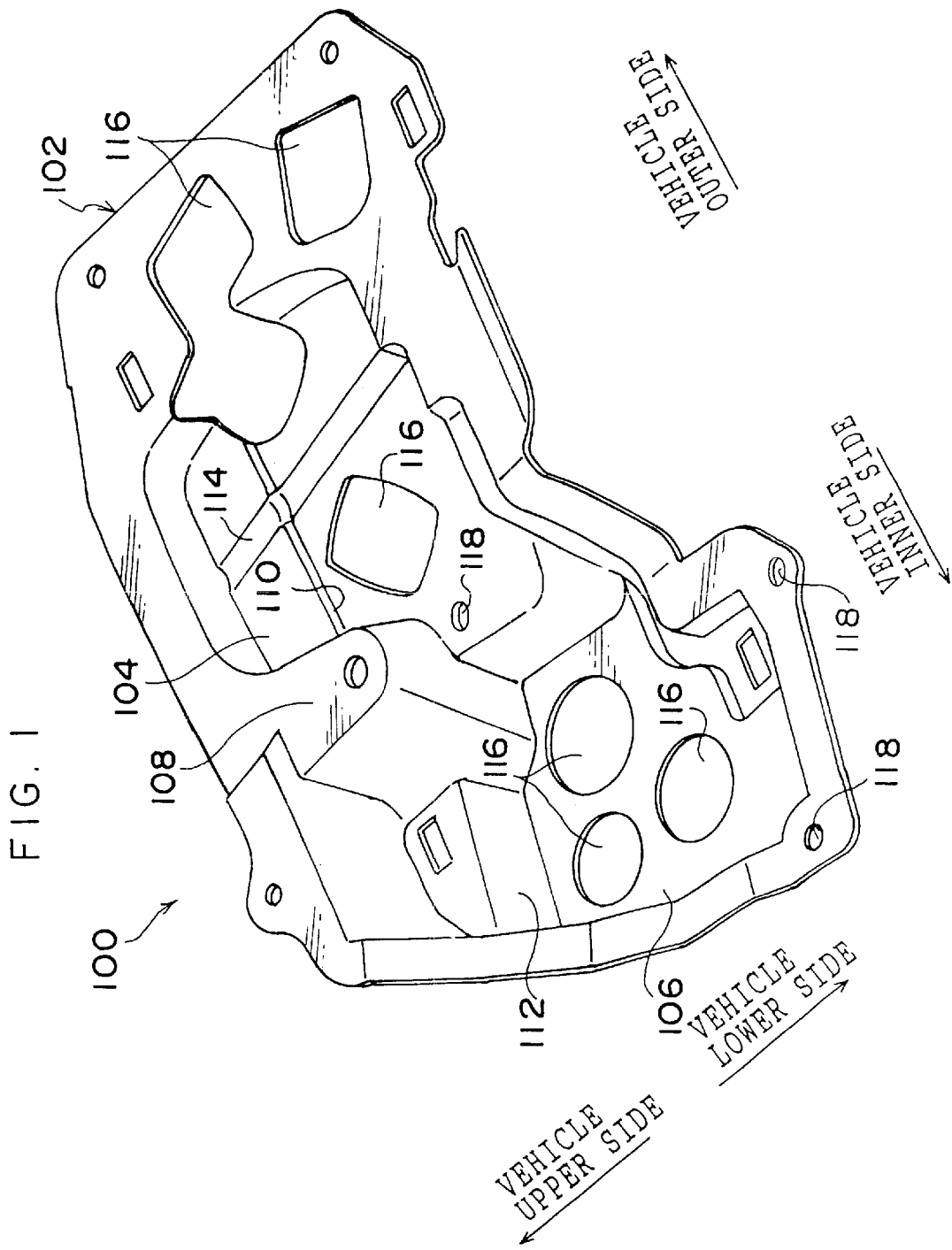
FIG. 1 is a perspective view showing a frame of a door mirror device for a vehicle relating to a first embodiment of the present invention.
Figure 2:
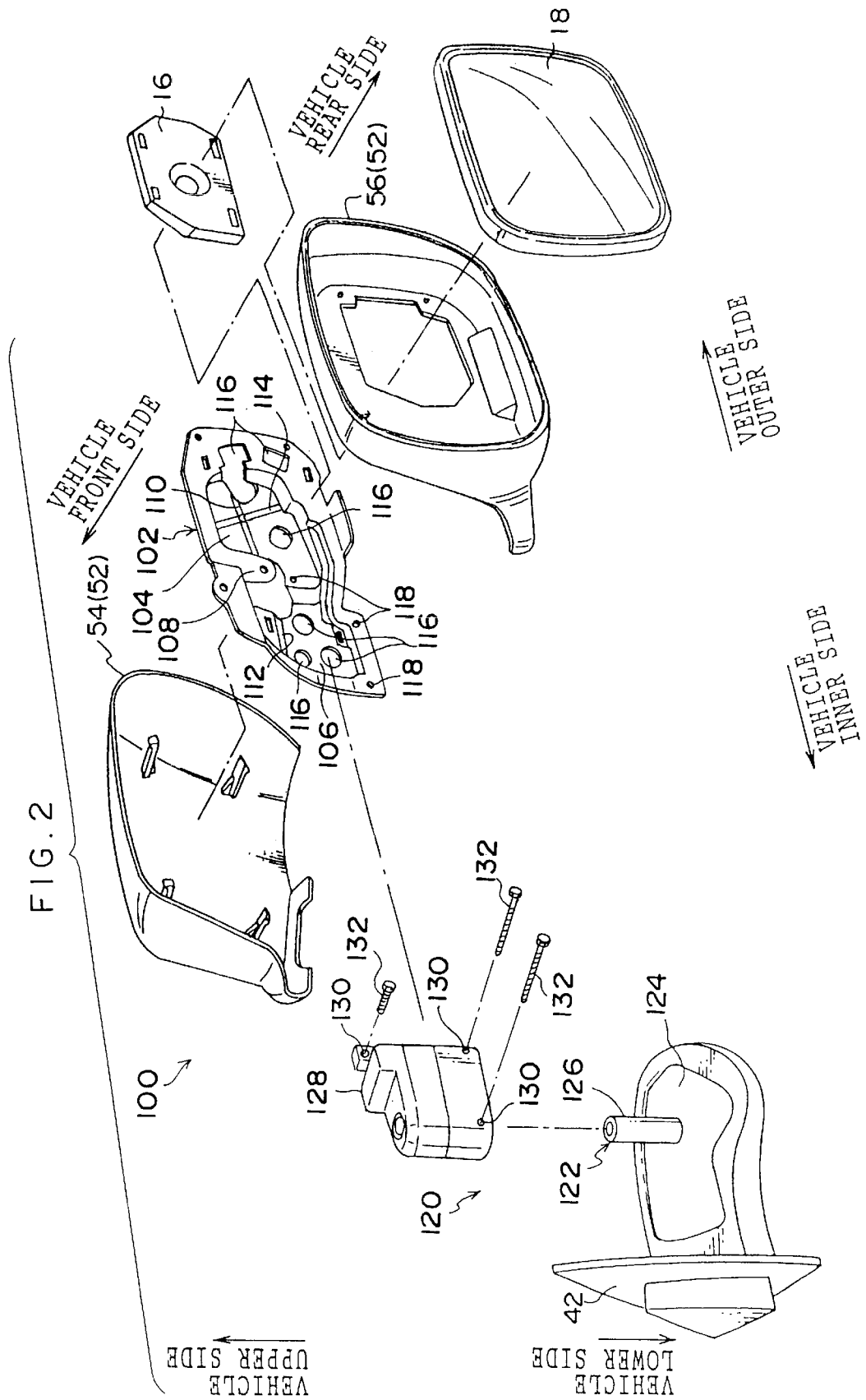
FIG. 2 is an exploded perspective view showing the door mirror device for a vehicle relating to the first embodiment of the present invention.

FIG. 1 is a perspective view showing a main portion of a door mirror device for a vehicle 100 relating to the first embodiment, to which a mirror device for a vehicle of the present invention is applied. FIG. 2 is an exploded perspective view of the door mirror device for a vehicle 100.

The door mirror device for a vehicle 100 relating to the present embodiment is provided with a substantially plate-like frame 102. The frame 102 is provided with a holding portion 104 at a vehicle outer rear side portion thereof, and a supporting portion 106 at a vehicle inner rear side portion thereof formed by drawing a frame-forming metal plate (such as an iron plate) which has been formed by pressing. The holding portion 104 is depressed toward a vehicle front side, and the supporting portion 106 is more depressed toward the vehicle front side than the holding portion 104. That is, a depth of drawing of the supporting portion 106 is deeper than that of the holding portion 104. Further, a drawn portion 108, which projects toward a vehicle rear side with respect to the holding portion 104 and the supporting portion 106, is formed by the drawing at an upper portion (a vehicle upper side) of a portion connecting the holding portion 104 and the supporting portion 106.

A stepped portion 110 which is substantially parallel with a vehicle width direction is provided at an upper portion (a vehicle upper side) of the holding portion 104. Further, a stepped portion 112 which is substantially parallel with the vehicle width direction is provided at an upper portion (a vehicle upper side) of the supporting portion 106. A depressed portion 114 which is substantially parallel with a vehicle vertical direction is formed in the holding portion 104, and the depressed portion 114 is slightly depressed toward the vehicle front side with respect to the holding portion 104. A plurality of openings 116 are formed in the frame 102, which are used for wiring a mirror angle adjusting device 16 and an retracting device 120 (which are described later), and for installing devices, and the like. Further, fixing holes 118 are formed at a vehicle outer end of an intermediate portion in the vehicle vertical direction of the supporting portion 106, at a lower side of a vehicle inner end of the supporting portion 106, and at a lower side of a vehicle outer end of the supporting portion 106 respectively.

The mirror angle adjusting device 16 as a holding member is coupled with the holding portion 104 of the frame 102. The mirror angle adjusting device 16 rockably holds a mirror 18 for viewing the rear of the vehicle, and the mirror angle adjusting device 16 rocks the mirror 18 to adjust a surface angle of the mirror 18.

Further, the door mirror device for a vehicle 100 is provided with the retracting device 120 as a supporting member, and the retracting device 120 includes a stand 122. A flat portion 124 is provided under (at a vehicle lower side of) the stand 122, and the stand 122 is fixed to a vehicle body by fixing the flat portion 124 to a door mirror stay 42 which is fixed to a door (not shown) of the vehicle. A cylindrical supporting shaft 126 is integrally provided to the flat portion 124 so as to project toward a vehicle upper side with respect to the flat portion 124.

The retracting device 120 further includes a casing member 128. The supporting shaft 126 is inserted into the casing member 128 so that the casing member 128 is rotatably supported by the stand 122. Through holes 130 are provided at a vehicle outer end of an upper portion (a vehicle upper side) of the casing member 128, and at a vehicle inner end and a vehicle outer end of a lower portion (a vehicle lower side) of the casing member 128. The through holes 130 are formed through the casing member 128 in a vehicle longitudinal direction and respectively correspond to the fixing holes 118 in the frame 102. The casing member 128 is coupled with the frame 102 by a plurality of screws 132 (three screws in the present embodiment) as coupling members being respectively inserted through the through holes 130 and fixing holes 118 and fixed. Thus, in this structure, the retracting device 120 supports the mirror 18 via the frame 102 and the mirror angle adjusting device 16.

The retracting device 120 is adapted to accommodate or to cause the mirror 18 to stand via the frame 102 and the mirror angle adjusting device 16 by rotating the casing member 128 with respect to the stand 122.

The frame 102, the mirror angle adjusting device 16 and the retracting device 120 are accommodated in a door mirror visor 52. The door mirror visor 52 consists of a visor cover 54 at a vehicle front side and a visor rim 56 at a vehicle rear side which are fitted together and respectively fixed to the frame 102.

Operation of the present embodiment is described next.

In the door mirror device for a vehicle 100 having the above-described structure, the frame 102 includes the holding portion 104 and the supporting portion 106, and the mirror angle adjusting device 16 holding the mirror 18 is coupled with the holding portion 104. At the same time, the retracting device 120 fixed to the vehicle body is coupled with the supporting portion 106. Thus, the retracting device 120 supports the mirror 18 through the frame 102 and the mirror angle adjusting device 16. Therefore, in order to reduce chattering of the mirror 18 so that an image in the mirror 18 is not affected, it is necessary to increase rigidity of the frame 102 at the holding portion 104, the supporting portion 106, and the portion connecting the holding portion 104 and the supporting portion 106.

Further, the holding portion 104 of the frame 102 holds not only the mirror 18 but also the mirror angle adjusting device 16. Similarly, the supporting portion 106 of the frame 102 holds the retracting device 120. Therefore, in order to hold these heavy items (the mirror angle adjusting device 16 and the retracting device 120) with certainty, it is necessary to increase rigidity of the frame 102 at the holding portion 104, the supporting portion 106, and the portion connecting the holding portion 104 and the supporting portion 106.

In addition, since the supporting portion 106 of the frame 102 supports an entire mirror assembly (including the mirror 18, the mirror angle adjusting device 16, the door mirror visor 52, and the like), it is required to have the highest rigidity.

Since the holding portion 104 and the supporting portion 106 are integrally formed by drawing the frame-forming metal plate which has been formed by pressing, both of them have sufficient rigidity. Further, since the portion connecting the holding portion 104 and the supporting portion 106 is provided with the drawn portion 108 formed by the drawing, the connecting portion also has sufficient rigidity provided by the drawn portion 108. Thus, the frame 102 can have sufficient rigidity. Therefore, the chattering of the mirror 18 can be reduced so that an image in the mirror 18 is not affected, and the frame 102 can hold the heavy items (the mirror angle adjusting device 16 and the retracting device 120) with certainty.

Furthermore, since the depth of drawing of the supporting portion 106 of the frame 102 is deeper than that of the holding portion 104 of the frame 102 to provide a difference in level at the connecting portion, the supporting portion 106 of the frame 102 can have a higher rigidity. Thus, the supporting portion 106 of the frame 102 can support the entire mirror assembly with certainty.

In addition, since the stepped portions 110 and 112 and the depressed portion 114 are formed in the frame 102, the frame 102 as a whole is formed to have an uneven surface so that it can have a higher rigidity.

Therefore, even when the plurality of openings 116 are formed in the frame 102, the frame 102 can have sufficient rigidity by including the holding portion 104, the supporting portion 106, the drawn portion 108, the stepped portions 110 and 112, the drawn portion 114, and the like.

Further, since the frame 102 is formed from the frame-forming metal plate which has been formed by pressing, it can be produced at a lower cost than that for a conventionally used thick frame formed of resin or by die casting, or the like.

Furthermore, since the plurality of openings 116 are formed in the frame 102, the frame 102 can be made light and can be produced at a lower cost.

Second Embodiment

Figure 3:
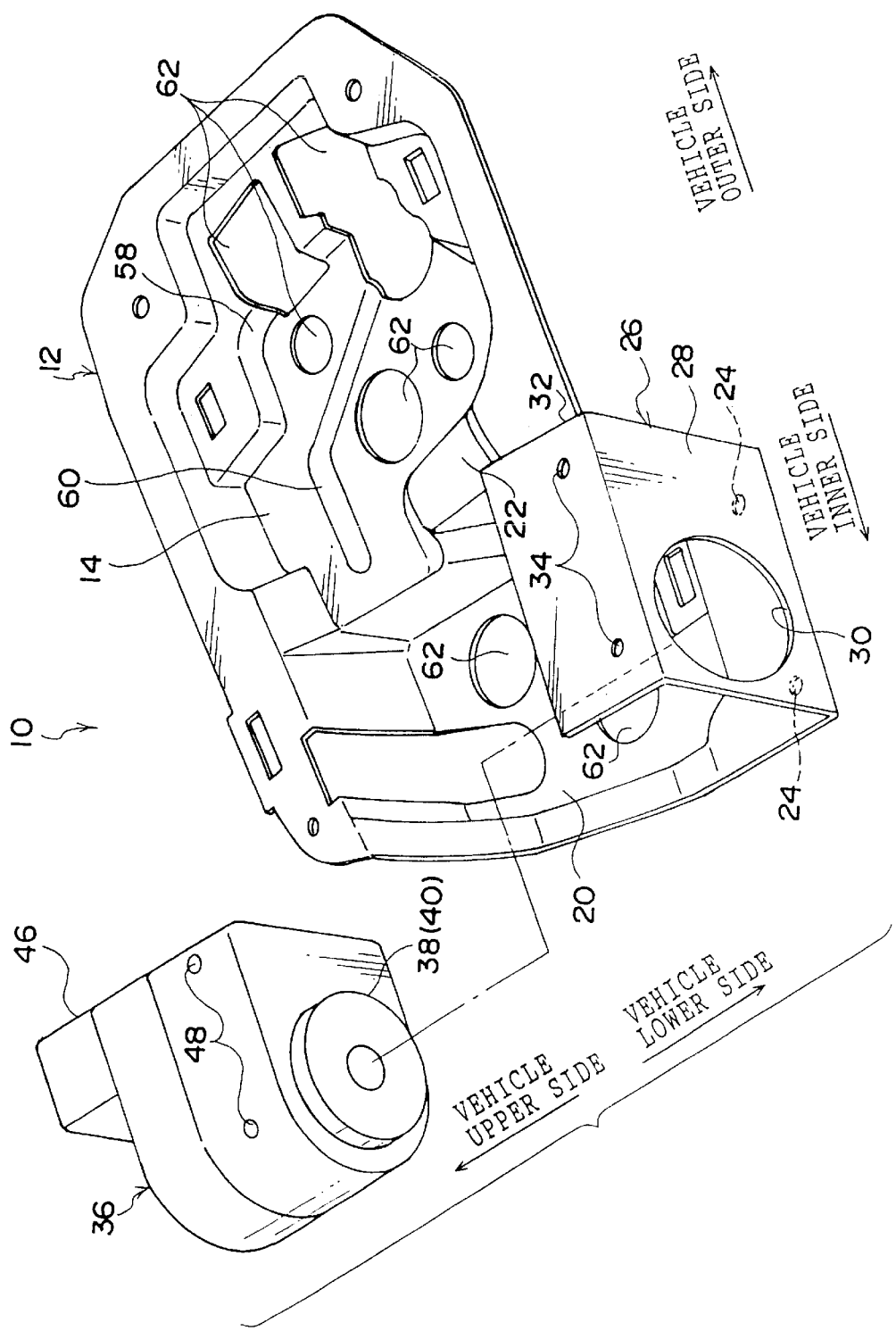
FIG. 3 is an exploded perspective view showing a main portion of a door mirror device for a vehicle relating to a second embodiment of the present invention.
Figure 4:
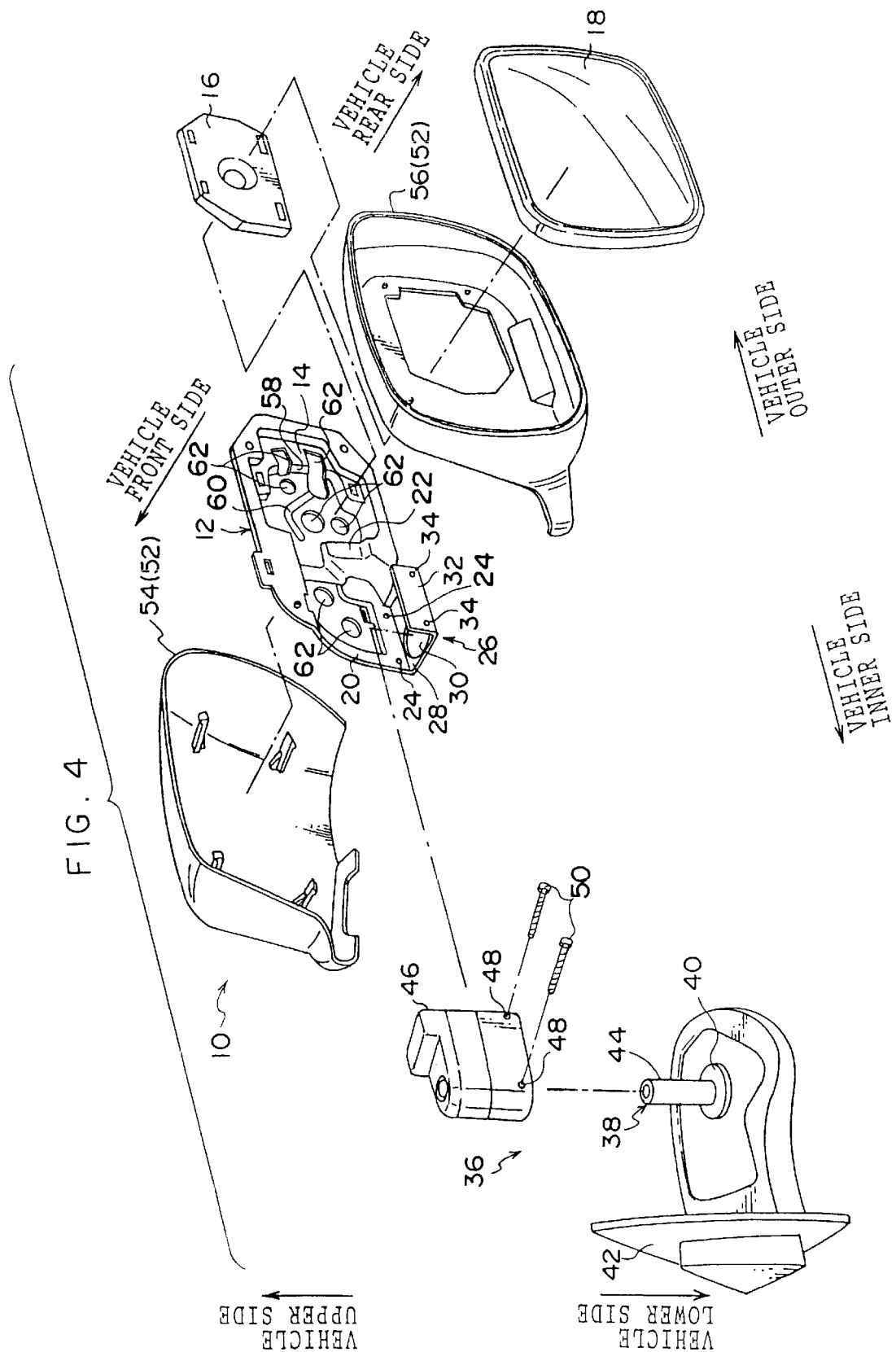
FIG. 4 is an exploded perspective view showing the door mirror device for a vehicle relating to the second embodiment of the present invention.

FIG. 3 is an exploded perspective view showing a main portion of a door mirror device for a vehicle 10 relating to the second embodiment, to which the mirror device for a vehicle of the present invention is applied. FIG. 4 is an exploded perspective view of the door mirror device for a vehicle 10.

The door mirror device for a vehicle 10 relating to the present embodiment is provided with a substantially plate-like frame 12. The frame 12 is provided with a holding portion 14 at a vehicle outer rear side portion thereof, and a supporting portion 20 at a vehicle inner rear side portion thereof formed by drawing a frame-forming metal plate (such as an iron plate) which has been formed by pressing. The holding portion 14 is depressed toward a vehicle front side, and the supporting portion 20 is more depressed toward the vehicle front side than the holding portion 14. That is, a depth of drawing of the supporting portion 20 is deeper than that of the holding portion 14. Further, a drawn portion 22, which projects toward a vehicle rear side with respect to the holding portion 14 and the supporting portion 20, is formed at a lower portion of a portion connecting the holding portion 14 and the supporting portion 20 by the drawing.

A stepped portion 58, which extends from an upper portion (a vehicle upper side) to a lower portion (a vehicle lower side) of the holding portion 14, is provided along a vehicle outer side of the holding portion 14. A depressed portion 60, which has a substantial L shape when viewed from top, is formed at a generally central section of the holding portion 14. The depressed portion 60 is slightly depressed toward the vehicle front side with respect to the holding portion 14. A plurality of openings 62 are formed in the frame 12, which are used for wiring a mirror angle adjusting device 16 and an retracting device 36, and for installing devices, and the like. Further, fixing holes 24 are formed at a vehicle inner end and a vehicle outer end of a lower portion (a vehicle lower side) of the supporting portion 20.

A projecting portion 26 made of a metal (such as iron), which projects toward the vehicle rear side with respect to the frame 12, is integrally formed at a lower portion of the supporting portion 20. The projecting portion 26 includes a vertical wall 28, which extends from a lower end (a vehicle lower side end portion) of the supporting portion 20 toward the vehicle rear side vertically with respect to the frame 12 (the supporting portion 20) and is integrally connected to the frame 12. A circular hole 30, which corresponds to a disk 40 of a stand 38 described later, is formed in the vertical wall 28. The projecting portion 26 further includes a parallel wall 32, which extends toward the vehicle upper side with respect to the vertical wall 28 so as to be substantially parallel to the supporting portion 20 and is integrally connected to the vertical wall 28. Inserting holes 34, which respectively correspond to the fixing holes 24, are formed at a vehicle inner end and a vehicle outer end of a lower portion (a vehicle lower side) of the parallel wall 32.

The mirror angle adjusting device 16 as a holding member is coupled with the holding portion 14 of the frame 12. The mirror angle adjusting device 16 rockably holds a rear-view mirror, and the mirror angle adjusting device 16 rocks the mirror 18 to adjust a surface angle of the mirror 18.

Further, the door mirror device for a vehicle 10 is provided with the retracting device 36 as a supporting member, and the retracting device 36 includes a stand 38 made of a metal. The disk 40 is provided at a bottom portion (at a vehicle lower side) of the stand 38, and the disk 40 is inserted into the circular hole 30 of the vertical wall 28. By fixing the disk 40 to a door mirror stay 42 fixed to a vehicle door (not shown) in a state in which the disk 40 is inserted in the circular hole 30, the stand 38 is fixed to a vehicle body. A cylindrical supporting shaft 44 is integrally provided at a central portion of the disk 40 so as to project toward a vehicle upper side with respect to the disk 40.

The retracting device 36 includes a casing member 46 made of a resin. The supporting shaft 44 is inserted into the casing member 46 so that the casing member 46 is rotatably supported by the stand 38. Through holes 48 are provided at a vehicle inner end and a vehicle outer end of a lower portion (at a vehicle lower side) of the casing member 46. The through holes 48 are formed through the casing member 46 in a vehicle longitudinal direction and respectively correspond to the fixing holes 24 in the frame 12 and the inserting holes 34 in the parallel wall 32. When the casing member 46 and the frame 12 are combined, the casing member 46 is enclosed by the frame 12, and the vertical wall 28 and the parallel wall 32 of the projecting portion 26. The casing member 46 is fixed to the frame 12 and the parallel wall 32 by a plurality of screws 50 (two screws in the present embodiment) as coupling members being inserted through the fixing holes 24, the through holes 48 and the inserting holes 34 and fixed. Thus, the casing member 46 is coupled with the frame 12 and the projecting portion 26. Further, the retracting device 36 supports the mirror 18 via the frame 12 and the mirror angle adjusting device 16.

The retracting device 36 is adapted to accommodate or cause the mirror 18 to stand via the frame 12 and the mirror angle adjusting device 16 by rotating the casing member 46 with respect to the stand 38.

The frame 12, the mirror angle adjusting device 16 and the retracting device 36 are accommodated in a door mirror visor 52. The door mirror visor 52 consists of a visor cover 54 at a vehicle front side and a visor rim 56 at a vehicle rear side which are fitted together and respectively fixed to the frame 12.

Operation and effects of the present embodiment are similar to those of the above-described first embodiment.

In addition, in the door mirror device for a vehicle 10 of the present embodiment, the projecting portion 26 projecting toward the vehicle rear side is integrally formed at the frame 12, and the casing member 46 is coupled with the two portions: the frame 12 (the supporting portion 20) and the projecting portion 26. Thus, the frame 12 and the projecting portion 26 can prevent the casing member 46 from being deflected by vibration of the vehicle, wind pressure, or the like, and chattering of the mirror 18 generated via the frame 12 and the mirror angle adjusting device 16 can be prevented, thereby improving a visibility of a rearward view reflected in the mirror 18. Particularly, deflection of the casing member 46 in the vehicle longitudinal direction can be prevented by the projecting portion 26, and therefore a change of an angle of the mirror 18 due to the deflection of the casing member 46 can be prevented, effectively improving the visibility of a rearward view reflected in the mirror 18.

Further, even when strength of the casing member 46 is low, the frame 12 and the projecting portion 26 can prevent a deflection of the casing member 46. Therefore, it is not necessary to increase a thickness of the casing member 46 to increase the strength of the casing member 46. Thus, the casing member 46 does not need to be large and the retracting device 36 can be installed in a small size car (such as a light car).

Furthermore, the casing member 46 is fixed to the frame 12 and the parallel wall 32 by the screws 50 being inserted through the frame 12, the casing member 46 and the parallel wall 32 in a state in which the casing member 46 is enclosed by the frame 12, and the vertical wall 28 and the parallel wall 32 of the projecting portion 26. Thus, the casing member 46 can be firmly coupled with the frame 12 and the projecting portion 26 with certainty to further improve the visibility of the rearward view reflected in the mirror 18.

Further, since the retracting device 36 can be fixed to the frame 12 and the parallel wall 32 only by tightening the screws 50 in one direction (a direction in which the screws penetrate the frame 12, the casing member 46 and the parallel wall 32), the retracting device 36 can be easily coupled with the frame 12 and the projecting portion 26.

In the present embodiment, the projecting portion 26 consists of the vertical wall 28 (a side wall which is substantially vertical with respect to and integral with the frame 12) and the parallel wall 32 (a side wall which is substantially parallel to the frame 12 and integral with the vertical wall 28), and the casing member 46 is fixed to the frame 12 and the parallel wall 32. However, this structure is not intended to limit the present invention, and the projecting portion may consist only of a vertical wall (a side wall which is substantially vertical to and integral with the frame) and the casing member may be fixed to the frame and the vertical wall.

Further, in the present embodiment, the vertical wall 28 extends from the lower end of the supporting portion 20 of the frame 12 to cover the bottom surface of the casing member 46. However, this structure is not intended to limit the present invention, and the vertical wall may extend from the supporting portion of the frame to cover at least one of the top surface (a vehicle upper side surface), the bottom surface (a vehicle lower side surface), the vehicle inner side surface and the vehicle outer side surface of the casing member.

Furthermore, in the present embodiment, the projecting portion 26 projects toward the vehicle rear side with respect to the frame 12. However, the projecting portion 26 may project toward the vehicle front side with respect to the frame 12.

In addition, in the present embodiment, the frame 12 is provided with the holding portion 14, the supporting portion 20 and the drawn portion 22 by drawing. However, the frame may not be provided with the holding portion, the supporting portion and the drawn portion by drawing. Even in such a structure, since the projecting portion is integrally provided to the frame, the frame can have sufficient rigidity provided by the projecting portion.

Further, in the first and the second embodiments described above, the frames 12 and 102 indirectly hold the mirror 18 via the mirror angle adjusting device 16. However, the frame may directly hold the mirror.

Furthermore, in the first and the second embodiments described above, the screws 50 and 132 are used as the coupling members. However, other coupling members such as bolts, rivets, pins, and the like, may be used as long as they can fix the retracting devices 36 and 120 to the frames 12 and 102 with certainty.

In addition, in the first and the second embodiments described above, the mirror device for a vehicle of the present invention is applied to the door mirror devices for a vehicle 10 and 100. However, the mirror device for a vehicle of the present invention may be applied to a fender mirror device for a vehicle.

As described above, in the mirror device for a vehicle of the present invention, the frame is provided with the holding portion, the supporting portion and the drawn portion by drawing the frame-forming metal plate which has been formed by pressing, and therefore the frame can have sufficient rigidity. Further, since the frame is formed from the frame-forming metal plate, the frame can be produced at a low cost.

In addition, since the depth of drawing of the supporting portion of the frame is deeper than that of the holding portion of the frame to provide a difference in level, the supporting portion of the frame can have a higher rigidity.

In the mirror device for a vehicle of the present invention, the supporting member is coupled with the two portions: the frame and the projecting portion. Therefore, the frame and the projecting portion can prevent a deflection of the supporting member so that a chattering of the mirror is not caused through the frame, thereby improving the visibility of a rearward view reflected in the mirror. Further, even when strength of the supporting member is low, the frame and the projecting portion can prevent a deflection of the supporting member. Therefore, the supporting member does not need to be large and the supporting member (such as the retracting device) can be installed in a small size car (such as a light car).

Furthermore, the supporting member is fixed to the frame and the parallel wall in a state in which the supporting member is enclosed by the vertical wall and the parallel wall. Therefore, the supporting member can be firmly coupled with the frame and the projecting portion with certainty, thereby further improving the visibility of a rearward view reflected in the mirror. In addition, since the supporting member can be fixed to the frame and the parallel wall only by tightening the screws in one direction, the supporting member can be easily coupled with the frame and the projecting portion.

What is claimed is:

1. A mirror device for a vehicle, the mirror device comprising:
  (a) a frame including a frame-forming metal plate formed by a pressing process, the frame including a holding portion, a supporting portion, and a drawn portion, the drawn portion being disposed at a position connecting the holding and supporting portions to one another, with the holding, supporting and drawn portions each being formed by a drawing process on the frame-forming metal plate that increases the rigidity of the metal plate in said portions;
  (b) a holding member for holding a rear-view mirror, coupled to the holding portion; and
  (c) a supporting member coupled to the supporting portion, with the supporting member mountable to a vehicle
  wherein said drawn portion is offset from and spaced away from a plane of said holding portion.

2. The mirror device for a vehicle according to claim 1, wherein the supporting portion is drawn to a level of depth deeper than the holding portion.

3. The mirror device for a vehicle according to claim 2, wherein the supporting and holding portions are drawn in one direction, and the drawn portion is drawn in an opposite direction.

4. The mirror device for a vehicle according to claim 2, wherein when the supporting member is mounted to a vehicle, the supporting portion is formed at a vehicle inner side of the frame, and the holding portion is formed towards the vehicle outer side relative to the supporting portion.

5. The mirror device for a vehicle according to claim 3, wherein the frame includes a stepped portion provided at the holding portion, with the stepped portion substantially parallel to a vehicle width direction when the supporting member is mounted to a vehicle, and disposed at a vehicle upper side of the holding portion.

6. The mirror device for a vehicle according to claim 5, wherein the frame includes another stepped portion, provided at the supporting portion, with said another stepped portion substantially parallel to the vehicle width direction when the supporting member is mounted to a vehicle, and disposed at a vehicle upper side of the supporting portion.

7. The mirror device for a vehicle according to claim 3, wherein the frame includes a plurality of openings defined in the frame.

8. The mirror device for a vehicle according to claim 3, wherein the holding member is a mirror angle adjusting device which rockably holds the mirror and is operable for adjusting an angle of the mirror.

9. The mirror device for a vehicle according to claim 8, wherein the supporting member is an retracting device.

10. The mirror device for a vehicle according to claim 9, wherein the retracting device comprises a casing member and a stand including a flat portion and a supporting shaft projecting from the flat portion toward a vehicle upper side when the supporting member is mounted to a vehicle.

11. The mirror device for a vehicle according to claim 10, further comprising a coupling member fixing the casing member to the frame, wherein the supporting shaft is inserted into the casing member and rotatably supports the frame relative to the casing member.

12. A mirror device for a vehicle comprising:
  (a) a frame including a frame-forming metal plate for at least one of directly and indirectly holding a rear-view minor, said plate having a supporting portion formed by a drawing process to increase the rigidity of the supporting portion;
  (b) a projecting portion integrally formed at the frame and projecting towards the vehicle front side or the vehicle rear side with respect to the frame when the minor device is in use with a vehicle; and (c) a supporting member coupled with the supporting portion of the frame and the projecting portion for supporting the minor, and mountable to the vehicle;

wherein said drawn portion is offset from and spaced away from a plane of said holding portion.

13. The mirror device for a vehicle according to claim 12, further comprising a coupling member, wherein the projecting portion comprises a vertical wall substantially perpendicular with respect to, and integrally connected to the frame, and a parallel wall substantially parallel to the frame, and the supporting member is coupled with the frame and the projecting member by the coupling member being inserted through the frame, the supporting member, and the parallel wall, with the supporting member enclosed by the frame, and the vertical and parallel walls.

14. The mirror device for a vehicle according to claim 13, further comprising a holding member for holding the mirror.

15. The mirror device for a vehicle according to claim 14, wherein the frame comprises a holding portion that may be coupled with the holding member and a supporting portion that may be coupled with the supporting member.

16. The mirror device for a vehicle according to claim 15, wherein the holding portion and the supporting portion of the frame are formed by drawing, and a drawn portion is formed by drawing at a portion connecting the holding portion and the supporting portion.

17. The mirror device for a vehicle according to claim 16, wherein the supporting portion is drawn to a level of depth deeper than the holding portion.

18. The mirror device for a vehicle according to claim 17, wherein the supporting and holding portions are drawn in one direction, and the connecting portion is drawn in an opposite direction.

19. The mirror device for a vehicle according to claim 18, wherein the holding portion includes a depressed portion formed at a generally central section of the holding portion.

20. A method of forming a mirror device for a vehicle comprising the steps of:

(a) pressing a metal into a plate for use as a frame;

(b) drawing the plate to form a holding portion, a supporting portion, and a drawn portion between the holding and supporting portions, wherein said drawing increases the rigidity of said plate in said portions;

(c) coupling to the holding portion a holding member for holding a mirror; and (d) coupling to the supporting portion a supporting member mountable to a vehicle.

21. A mirror device for a vehicle, the mirror device comprising:

(a) a frame including a frame-forming metal plate formed by a pressing process, the frame including a holding portion, a supporting portion, and a drawn portion, the drawn portion being disposed at a position connecting the holding and supporting portions to one another, with the holding, supporting and drawn portions each being formed by a drawing process on the frame-forming metal plate that increases the rigidity of the metal plate in said portions;

(b) a holding member for holding a rear-view mirror, coupled to the holding portion; and (c) a supporting member coupled to the supporting portion, with the supporting member mountable to a vehicle wherein the supporting portion is drawn to a level of depth deeper than the holding portion, and wherein the supporting and holding portions are drawn in one direction, and the drawn portion is drawn in an opposite direction.

22. A mirror device for a vehicle comprising:

(a) a frame including a frame-forming metal plate for at least one of directly and indirectly holding a rear-view mirror, said plate having a supporting portion formed by a drawing process to increase the rigidity of the supporting portion;

(b) a projecting portion integrally formed at the frame and projecting towards the vehicle front side or the vehicle rear side with respect to the frame when the mirror device is in use with a vehicle; and (c) a supporting member coupled with the supporting portion of the frame and the projecting portion for supporting the mirror, and mountable to the vehicle, and further including a coupling member, wherein the projecting portion comprises a vertical wall substantially perpendicular with respect to, and integrally connected to the frame, and a parallel wall substantially parallel to the frame, and the supporting member is coupled with the frame and the projecting member by the coupling member being inserted through the frame, the supporting member, and the parallel wall, with the supporting member enclosed by the frame, and the vertical and parallel walls.

* * * * *